Oct. 3, 1933.   W. M. PIATT   1,929,179
SEWAGE DISPOSAL
Filed Nov. 6, 1930
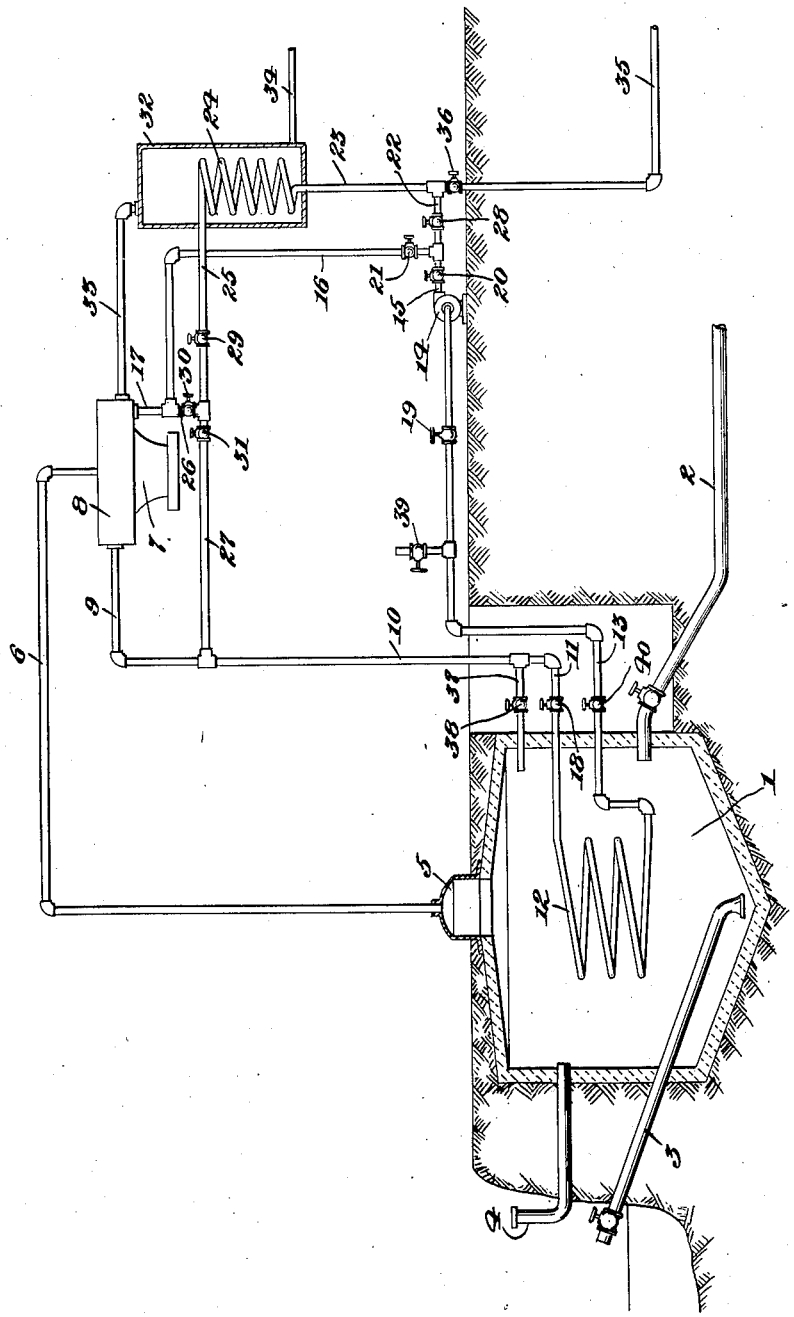
Inventor:
W. M. Piatt,
by Karl Fenning
his Atty.

Patented Oct. 3, 1933

1,929,179

UNITED STATES PATENT OFFICE 1,929,179

SEWAGE DISPOSAL

William M. Piatt, Durham, N. C.

Application November 6, 1930. Serial No. 493,864

9 Claims. (Cl. 210—2)

The present invention relates to the disposal of sewage sludge by digestion and has for its general purpose economies and efficiencies in operation.

In many sewage treatment processes the raw sewage is first introduced into preliminary settling tanks where it may be partially treated and the process commenced. The fresh solids removed from the preliminary settling tank may be digested and further treated in digestion tanks either alone or together with other sludge from other steps in the treatment. Sometimes these tanks are covered and sometimes not. It has been discovered that by keeping the sludge in the digestion tank slightly alkaline the sludge does not merely liquefy as in the older process but it may be very largely converted into gas. It has been found that the greater percentage of the gas so produced is methane. The methane content of the gas is sometimes as high as 85% to 90%, the other gases present including carbon dioxide, oxygen etc. From such a rich, highly combustible gas, energy and heat may be produced. The sludge digestion tank may be provided with a gas-tight cover and the gas withdrawn either to a gas holder or directly to the place or apparatus where the gas is to be used.

Since power is required for various purposes about a sewage disposal plant and particularly so in activated sludge plants it may be desirable to employ the gas from the digestion tank to operate a gas engine to produce the power or a part of it and this has been found practical and economical. When gas is employed in the gas engine, however, only about 20% to 35% of the heat in the gas is utilized and converted into power the remaining heat passing out normally and being dissipated in the exhaust from the engine, in the jacket cooling water and otherwise.

In order to keep continuous the bacterial action in the sludge digestion tank, it is essential to keep the contents of the tank warm or within certain limits of temperature. That is, the bacterial action becomes sluggish at low temperatures and at temperatures as low as 50° F. the bacterial action may cease altogether. Obviously in sewage disposal plants in locations in which the temperature goes down to points below the critical point for the bacterial action in the winter, it may be necessary to provide storage or digestion tanks large enough to store the sewage received during several months until the atmospheric temperature again becomes warm enough to heat the sludge to a point where the bacterial action may proceed. It has been found that the expense of such large storage tanks may be largely eliminated and the bacterial action may be kept more or less continuous by heating or controlling the temperature of the digestion tank or its contents.

When the gas from the digestion tank is employed to produce the desired power by means of a gas engine the heat unconverted into energy may be employed for heating the sludge in the digestion tank to a point necessary or desirable to maintain the bacterial activity.

The present invention, therefore, contemplates collecting the combustible gas from the digestion chamber and employing it to produce power in a gas engine at the same time using the excess or unconverted heat produced by the gas engine for heating the digestion tank to keep continuous the bacterial action.

While there is a critical lower limit in the temperature to which the bacterial action progresses there may also be a critical upper temperature beyond which it is undesirable to go for danger of destroying the bacteria or interfering with the bacterial action. The usual top limit is about 82° F. although it has been suggested that by operating with other classes of bacteria that flourish under high temperatures, considerably higher temperatures may be employed, the sludge even being raised in some instances to upwards of 140° F. The temperature to which the sludge in the digestion tank is raised forms no part of the present invention but it is referred to to indicate that by proper adjustments the present invention contemplates employing the heat produced by the gas from the sludge to maintain the contents of the digestion tank at a suitable temperature which may be varied in accordance with the necessities of the case or the desires of the operator as will more clearly appear hereinafter.

The specific details of the means employed for transferring the heat of the gas to the contents of the digestion tank is immaterial and are not essential parts of the present invention. In order, however, to more fully explain the invention there is shown in the accompanying drawing in diagrammatic form apparatus which may be employed to effect the purposes of the invention.

The drawing shows a typical digestion tank 1 into which leads a pipe 2 through which the sludge may be introduced for treatment. A sludge withdrawal pipe 3 is indicated and the digestion tank 1 may be provided with an overflow pipe 4. A gas dome 5 is indicated at the top of the digestion tank 1 and from it leads a pipe 6 carrying gas to a gas engine 7 from which energy may be taken in any desired or usual manner for use in any way desired. For simplicity the gas holder sometimes employed to accumulate gas before feeding it to the gas engine is not illustrated. The gas engine 7 may be provided with a cooling water jacket 8 from which the heated cooling water may pass through the pipe 9 which joins the pipe 10 leading to the pipe 11 which enters one end of a coil 12 in the digestion tank 1. The other end of the coil 12 enters a pipe 13 leading to a pump 14 having an outlet pipe 15 connected through a pipe 16 to the pipe 17 which enters the water jacket 8 of the gas engine 7. In the pipe 11 is a valve 18; in the pipe 13 are valves 19 and 40 and running from the pipe 13 between the valves 40 and 19 is an open pipe controlled by a valve 39; in the pipe 15 is a valve 20; in the pipe 16 is a valve 21. Also connecting with the pipe 15 is a pipe 22 connecting with a pipe 23 in which is a coil 24 connecting with a pipe 25 leading to a pipe 26 connecting with the pipe 17. The pipe 25 also connects with a pipe 27 connecting with the pipe 10. In the pipe 22 is a valve 28; in the pipe 25 is a valve 29; in the pipe 26 is a valve 30; in the pipe 27 is a valve 31. The coil 24 is in a chamber 32 into which may be led the exhaust gases from the gas engine 7 by means of a conduit 33; an outlet 34 being shown for the chamber 32. Water from any suitable water supply may enter the system through the pipe 35 which is connected to the pipes 22 and 23; in the pipe 35 is a valve 36. Leading from the pipe 10 is a pipe 37 opening into the digestion tank 1. In the pipe 37 is a valve 38.

When the apparatus is in operation, gas being collected from the digestion tank 1, may pass to and operate the gas engine. In order to appropriately cool the gas engine and absorb the waste heat, water may enter the pipe 35 and pass through the valve 36, which is now open, into the pipe 22 through the open valve 28 into the pipe 16 through the open valve 21 through the pipe 17 into the water jacket 8 then out through the pipe 9 and through the pipe 10 into the pipe 37 through the open valve 38 and into the digestion tank 1. In its passage through the water jacket 8 the water will be heated and its admission to the digestion tank 1 will maintain the contents of the tank heated. Any excess of liquid produced by the entrance of the water may run out from the digestion tank 1 through the overflow pipe 4 or may be returned to the untreated sewage. In this use of the apparatus the valves 18, 19, 20, 29, 30, 31 and 39 may be closed thus cutting out of the system the coils 12 and 24 and the pump 14.

Another way in which the system may be employed contemplates closing only the valves 18, 19, 20, 31, 39 and 40, the valves 36, 28, 21, 29, 30 and 38 being open. Cooling water will enter the pipe 35 and pass through the open valve 36. It may then divide, one part going through the pipe 22 and the open valve 28 to the pipe 16 through the open valve 21 into the pipe 17. Another portion of the water from the pipe 35 passing through the open valve 36 and the pipe 23 goes through the coil 24 and out through the pipe 25 and the open valve 29 into the pipe 26 through the open valve 30 to the pipe 17 from which the combined flow of water goes through the water jacket 8 of the gas engine where it is further heated and out through the pipe 9 to the pipe 10 and through the pipe 37 and the open valve 38 into the digestion tank 1. It will be noted that in this arrangement a portion of the incoming water passing through the coil 24 in the exhaust chamber 32 may be heated and mixed with the rest of the water before it enters the water jacket 8.

Another arrangement may contemplate closing the valves 18, 19, 20, 28, 21, 31, 39 and 40, the valves 36, 29, 30 and 38 being open. The water now coming through the pipe 35 passes through the open valve 36 into the pipe 23 through the coil 24 where it is heated by the exhaust gases in the chamber 32. The heated water then passes into the pipe 25 through the open valve 29 into the pipe 26 through the open valve 30 to the pipe 17 and through the water jacket 8 where it is further heated and comes out through the pipe 9 into the pipe 10 and into the pipe 37 and through the open valve 38 and into the digestion tank 1.

Another adjustment of the apparatus may contemplate closing the valves 18, 19, 20, 30, 39 and 40 leaving open the valves 36, 28, 21, 29, 31 and 38. By this arrangement the water coming in through the pipe 35 and passing the open valve 36 divides into two paths. One portion of the water goes into the pipe 22 and through the open valve 28 to the pipe 16 through the open valve 21 into the pipe 17 and through the water jacket 8 where it is heated. The heated water coming out through the pipe 9 enters the pipe 10. Another portion of the incoming water passing through the open valve 36 goes to the pipe 23 and through the coil 24 where it is heated by the exhaust gases in the chamber 32. The heated water then passes by way of the pipe 25 through the open valve 29 into the pipe 27 through the open valve 31 into the pipe 10 where it joins the other portion of the water which has been heated in the water jacket 8. From the pipe 10 the water passes into the pipe 37 and through the open valve 38 into the digestion tank 1.

Another arrangement of the apparatus may contemplate closing the valves 18, 19, 20, 29, 30, 31, 39 and 40, leaving open the valves 21, 28, 36 and 38. The water coming in through the pipe 35 may then pass through the open valve 36 into the pipe 22 and through open valves 28 and 21, into the pipes 16 and 17 and through the water jacket 8 and out through pipes 9 and 10 from which it enters the pipe 37 passing through the open valve 38 into the digestion tank 1.

The arrangements so far described contemplate a more or less continuous entrance of fresh or additional water into the system and the delivery into the digestion tank 1 of a more or less continuous stream of heated water which freely mixes with the sewage or sludge being treated. This may be the desirable proceeding and there may be important advantages in so operating. It may be desired, however, to use over again the water employed for heating the sludge in the digestion tank 1 and it may be desired to keep from adding water freely to the digestion tank 1. Under these circumstances it may be desirable to employ some such device as the closed coil 12 imbedded in the contents of the digestion tank 1 to impart heat thereto. One way of carrying out this aspect of the invention may contemplate closing the valves 38, 36, 28, 29, 30, 31 and 39, leaving open the valves 18, 19, 20, 21 and 40. The system having once been filled with water, the pump 14 then may draw water from the coil 12 through the valves 19 and 40 through the pipe 13 and force it through the pipe 15 through the open valve 20 and into the pipe 16 through the open valve 21 from which it passes through the pipe 17 into the water jacket 8 and out the pipe 9 through the pipe 10 into the pipe 11 and through the open valve 18 again into the coil 12. By this arrangement the water absorbs heat in the water jacket 8 and transfers it through the coil 12 into the contents of the digestion tank 1.

Another arrangement may involve closing the valves 38, 36, 21, 31 and 39, leaving open the valves 18, 19, 20, 28, 29, 30 and 40. The pump 14 may then draw water from the coil 12 through the open valves 19 and 40 into the pipe 13 into the pipe 15 through the open valve 20 into the pipe 22 through the open valve 28 into the pipe 23 through the coil 24 where it may be heated by the exhaust gases in the chamber 32, into the pipe 25 through the open valve 29 into the pipe 26 through the open valve 30 into the pipe 17 through the water jacket 8 out through the pipe 9 and into the pipe 10 through the pipe 11 and the open valve 18 and into the coil 12.

Another means of carrying out the invention may contemplate closing the valves 38, 36, 31 and 39, leaving open the valves 18, 19, 20, 28, 21, 29, 30 and 40. The pump 14 may now draw water from the coil 12 through the open valves 19 and 40 and the pipe 13, forcing it through the pipe 15 and the open valve 20, one portion of the water going through the pipe 22 and the open valve 28 into the pipe 23 and through the coil 24 where it is heated by the exhaust gases from the engine in the chamber 32 into the pipe 25 and through the open valve 29 into the pipe 26 through the open valve 30 through the pipe 17. Another portion of the water may pass through the pipe 16 through the open valve 21 and into the pipe 17 where it joins the first portion of the water. All the water then passes through the water jacket 8 where it may be additionally heated and out through the pipe 9 through the pipe 10 into the pipe 11 through the open valve 18 and into the coil 12.

Another arrangement may contemplate closing the valves 38, 36, 30 and 39, leaving open the valves 18, 19, 20, 28, 21, 29, 31 and 40. With the apparatus so adjusted the pump 14 may draw water from the coil 12 into the pipe 13 through the open valves 19 and 40 and force it into the pipe 15, one portion of the water passing into the pipe 22 through the open valve 28 into the pipe 23 through the coil 24 where it is heated by the exhaust gases from the engine in the chamber 32, into the pipe 25 through the open valve 29 into the pipe 27 through the open valve 31 and into the pipe 10. Another portion of the water may pass into the pipe 16 through the open valve 21 into the pipe 17 and through the water jacket 8 where it may be heated and come out through the pipe 9 and pipe 10 where it joins the first portion of the water. From the pipe 10 the water passes into the pipe 11 and through the pipe 18 and into the coil 12.

With any of the arrangements in which the pump 14 is employed and the heated water passes through a closed circuit, may be employed fresh water added to the system and when heated discharged freely into the digestion tank 1. This may be accomplished by opening the valve 36 to a suitable extent to allow water to enter the system and opening the valve 38 to a suitable extent to allow the excess water to run freely into the contents of the digestion tank 1.

In addition to the valve 19 there may be placed in the pipe 13 a valve 40 which is arranged just outside the tank 1 adjacent the coil 12. On the pipe 13 between the valve 19 and the valve 40 may be arranged an open outlet pipe controlled by a valve 39. It is thus possible to operate the apparatus without the use of the pump 15 to produce the circulation of the heating water. The pressure of the water supply system feeding water through the pipe 35 may be relied on to produce circulation of incoming water through the system, whether or not it includes the coil 24 in the exhaust chamber 32 and the water jacket 8, and on into the tank 1 or through the coil 12. When the pump 14 is not operating, by closing the valves 19, 20, 30 and 38 and opening the valves 18, 21, 28, 29, 31, 36, 39 and 40 water may enter the pipe 35 and pass the valve 36, a portion continuing directly through the pipe 23 the coil 24 into the pipe 25 through the open valves 29 and 31 into the pipe 27 and into the pipe 10, another portion of the water passing through the pipe 22, the valves 28 and 21 into the pipe 16 and the pipe 17 through the water jacket 8 and the pipe 9 from which it joins the other water in the pipe 10 from which it passes through the valve 18 into the coil 12 out through the valve 40 and exhausts through the open valve 39. By appropriate adjustment of the valves similar passages may be provided by which all of the water coming in through the pipe 35 may pass through the coil 24 and water jacket 8 in succession and through the coil 12 and then be exhausted through the valve 39. Likewise some or all of the water admitted through the pipe 35 in either of these ways may pass through the valve 38 and into the tank 1.

It is clear then that by the present invention, means are employed for absorbing substantially all or only a part of the waste heat of the gas engine by passing the water through both the water jacket of the engine and coil in the exhaust chamber, or by passing it through either of these heat exchanging devices or by passing some of the water through one and some through the other. It is also possible to pass a portion of the water through one of these heat exchanging devices or both of them and allow another portion of the water to go directly to the digestion tank 1 or the coil 12 therein without passing through any heat exchanging means. Thus water entering the pipe 16 when the valve 21 is open may pass through the pipe 26 when the valve 30 is open and through the pipe 27 when the valve 31 is open, going thence to the pipe 10 and either alone or mixed with heated water may pass through the pipe 37 and the open valve 38 freely into the digestion tank 1 or through the pipe 11 through the valve 18 when it is open into the coil 12 in the digestion tank 1. Other adjustments and arrangements of the valves and portions of the apparatus to suit the necessities of the case or the desires of the operator may be made to absorb all or suitable portions of the excess heat and return it to the digestion tank through the coil 12 or through water freely admitted to the contents of the tank. When it is not desired to absorb the heat from the engine water jacket into the system any other suitable means may be employed to cool the engine.

The amount of heat required to maintain the proper temperature in the digestion tank is variable within wide limits and may depend upon whether or not the tanks are buried in the ground and well covered with earth or other heat insulators and also upon the latitude of the region in which the tank is located. The amount of heat required will also vary with the season of the year. The amount of heat required may also depend upon how thick the sludge is when it is put into the digestion tank. If the sludge is concentrated, with very little water, it may take very little heat to bring it up to the critical temperature or the temperature at which the tank is to operate.

While there may be advantages in employing a heating coil in the digestion tank and so employing a constant quantity of water in a more or less closed circuit for the heating, there may be mechanical and thermal difficulties involved. The coil may crust up and become covered either on the inside or the outside or both by a layer of heated material so that the discharging of heat into the sludge might become slight. The use of a coil and the closed circuit, however, has the advantages that a less quantity of water may be necessary and there may be substantially no overflow from the digestion tank. This may be a less disadvantage when the overflow of the digestion tank is passed into the raw sewage in the settling tank.

Heat exchanging mechanism is employed to release the heat in the water in the digestion tank 1 and also to allow the water to absorb heat in the exhaust chamber 32. Any suitable heat exchanging mechanisms might be employed in these positions. They have been illustrated as coils 12 and 24. It will be understood, however, that the term, coil, is employed as meaning not the specific structure shown but any suitable heat exchanging mechanisms or devices.

It will be observed that an important phase of the present invention is the recovery of gas from the digestion tank and the economical use of that gas to produce power for operation of the plant or for other purposes while at the same time conserving and using the excess or waste heat to continue or maintain the action of the microbes on the sludge to destroy it and produce additional gas by maintaining a proper temperature in the digestion tank.

I claim as my invention:

1. In a sewage disposal system, a digestion tank, means for collecting gas from the digestion tank and converting it into power and heat, a normally closed water circulating system including means for absorbing the heat and a coil in the tank for heating the contents of the tank, means for introducing additional water to the water system, and means for introducing some of the water from the circulating system into the tank.

2. In a sewage disposal system, a digestion tank, a gas engine, means for collecting gas from the tank and delivering it to the engine, a water jacket for the engine, an exhaust chamber for the engine, a coil in the exhaust chamber, a coil in the tank, a pump for causing water to circulate through the coils and the water jacket, means for by-passing the coil in the exhaust chamber, means for introducing additional water to the system, and means for introducing some of the water into the tank.

3. In a sewage disposal system, a digestion tank, means for collecting gas from the tank, means for converting the gas into power and heat, a coil in the tank, means for causing water to absorb the heat and pass through the coil to heat the contents of the tank, and means for releasing the water into the tank.

4. In a sewage disposal system, a digestion tank, means for collecting gas from the tank, a gas engine operated by the gas, and means for causing the waste heat of the gas engine to heat the contents of the digestion tank.

5. In a sewage disposal system, a digestion tank, a coil in the tank, a gas engine, means for collecting gas from the tank and delivering it to the engine, a pump for causing water to be heated by the engine and to circulate through the coil, and means for causing at least some of the water to by-pass the engine.

6. In a sewage disposal system, a digestion tank, a gas engine, means for collecting gas from the tank and delivering it to the engine, a water jacket for the engine, an exhaust chamber for the engine, a coil in the exhaust chamber, a coil in the tank, a pump for causing water to circulate through the coils and the water jacket, and means for by-passing the water jacket.

7. In a sewage disposal system, a digestion tank, a gas engine, means for collecting gas from the tank and delivering it to the engine, a water jacket for the engine, an exhaust chamber for the engine, a coil in the exhaust chamber, a coil in the tank, a pump for causing water to circulate through the coils and the water jacket, means for by-passing the water jacket, means for introducing additional water to the system, and means for introducing some of the water into the tank.

8. In a sewage disposal system, a digestion tank, a coil in the tank, a gas engine, means for collecting gas from the tank and delivering it to the engine, a water jacket for the engine, an exhaust chamber for the engine, a coil in the exhaust chamber, means for circulating water partly through the exhaust chamber coil and partly through the water jacket and then through the coil in the tank.

9. In a sewage disposal system, a digestion tank, a gas engine, means for collecting gas from the tank and delivering it to the engine, a water jacket for the engine, an exhaust chamber for the engine, a coil in the exhaust chamber, means for passing water partly through the coil and partly through the water jacket and then into the tank.

WM. M. PIATT.